United States Patent
Fang et al.

(10) Patent No.: US 10,826,413 B2
(45) Date of Patent: Nov. 3, 2020

(54) POWER SUPPLY AND POWER SUPPLY METHOD WITH CIRCULATION CURRENT COMPENSATION

(71) Applicant: Huawei Technologies Co., Ltd., Shenzhen (CN)

(72) Inventors: Xiaoting Fang, Xi'an (CN); Zhihua Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/521,195

(22) Filed: Jul. 24, 2019

(65) Prior Publication Data

US 2019/0356241 A1    Nov. 21, 2019

Related U.S. Application Data

(63) Continuation of application No. PCT/EP2017/051370, filed on Jan. 24, 2017.

(51) Int. Cl.
*H02M 7/539*       (2006.01)
*H02M 7/5395*      (2006.01)
*H02M 7/04*        (2006.01)

(52) U.S. Cl.
CPC ......... *H02M 7/5395* (2013.01); *H02M 7/043* (2013.01)

(58) Field of Classification Search
CPC .......... H02M 1/12; H02M 1/126; H02M 1/40; H02M 7/04; H02M 7/043; H02M 7/483; H02M 7/539; H02M 7/5395
See application file for complete search history.

(56) References Cited

U.S. PATENT DOCUMENTS

| 5,808,453 | A | 9/1998 | Lee et al. | |
| 6,665,198 | B2 * | 12/2003 | Tasi | H02J 3/01 |
| | | | | 307/46 |
| 10,476,371 | B2 * | 11/2019 | George | H02M 7/493 |
| 2004/0070283 | A1 | 4/2004 | Maple | |

(Continued)

FOREIGN PATENT DOCUMENTS

CN    104836209 A    8/2015

OTHER PUBLICATIONS

Miller, S., K., T., et al., "A Comprehensive Study of Harmonic Cancellation Effects in Interleaved Three-Phase VSCs," XP031218263, IEEE, Power Electronics Specialists Conference, Jun. 17, 2007, pp. 29-35.

(Continued)

*Primary Examiner* — Matthew V Nguyen
(74) *Attorney, Agent, or Firm* — Conley Rose, P.C.

(57) ABSTRACT

A power supply comprises an inverter leg adapted to generate a first pulse width modulation signal by modulating an input signal, a phase shifter, which is adapted to generate a provisional second pulse width modulation signal by phase shifting a signal from which the first pulse width modulation signal is derived, a compensator, which is adapted to determine a second pulse width modulation signal from the provisional second pulse width modulation signal and add a compensation signal during the generating of the second pulse width modulation signal, and a coupled inductor, which is adapted to combine the first pulse width modulation signal and the second pulse width modulation signal to form the output signal.

20 Claims, 6 Drawing Sheets

(56) References Cited

U.S. PATENT DOCUMENTS

| | | |
|---|---|---|
| 2010/0090670 A1 | 4/2010 | Kelly |
| 2017/0244343 A1* | 8/2017 | Messaoudi ............ H02M 1/126 |
| 2017/0338647 A1 | 11/2017 | Xiang et al. |
| 2018/0212520 A1* | 7/2018 | Zhang .................... H02M 1/12 |

OTHER PUBLICATIONS

Wang, Z., et al., "Paralleling GaN HEMTs for Diode-free Bridge Power Converters," XP032775379, IEEE Applied Power Electronics Conference and Exposition (APEC), Mar. 15, 2015, pp. 752-758.
Foreign Communication From a Counterpart Application, PCT Application No. PCT/EP2017/051370, International Search Report dated Nov. 14, 2017, 16 pages.

* cited by examiner

US 10,826,413 B2

POWER SUPPLY AND POWER SUPPLY METHOD WITH CIRCULATION CURRENT COMPENSATION

CROSS-REFERENCE TO RELATED APPLICATIONS

This application is a continuation of International Application No. PCT/EP2017/051370, filed on Jan. 24, 2017, the disclosure of which is hereby incorporated by reference in its entirety.

TECHNICAL FIELD

The disclosure relates to switched power supplies.

BACKGROUND

In switched power supplies, an increased efficiency and reduced hardware cost can be achieved using more than one switching leg. When combining the signals generated by the more than one switching legs in a coupled inductor, circulation currents can arise. These circulation currents lead to a magnetic saturation of the coupled inductor and thereby to coupling losses. It is therefore important to prevent such circulation currents within the coupled inductor.

One exemplary solution to this problem is to provide a hall current transducer in each switching leg in order to measure the current in each switching leg. By this method, it is possible to determine the presence of circulation current and to counteract it. This method though is disadvantageous, since hall current transducers are rather expensive components.

SUMMARY

The object of the disclosure therefore is to provide a power supply and a method for generating an output signal, which achieve a high efficiency, while at the same time keeping the hardware costs to a minimum.

The object is solved by the features of claim 1 for the apparatus and claim 9 for the method. The dependent claims contain further developments.

According to a first aspect of the disclosure, a power supply for generating an output signal is provided. The power supply comprises an inverter leg adapted to generate a first pulse width modulation signal by modulating an input signal. Moreover, the power supply comprises a phase shifter, which is adapted to generate a provisional second pulse width modulation signal by phase shifting a signal, the first pulse width modulation signal is derived from. Furthermore, the power supply comprises a compensator, which is adapted to determine a second pulse width modulation signal from the provisional second pulse width modulation signal. Especially, the compensator adds a compensation signal during the generating of the second pulse width modulation signal. Finally, the power supply comprises a coupled inductor, which is adapted to combine the first pulse width modulation signal and the second pulse width modulation signal to form the output signal. Using the compensation signal, it is possible to compensate circulation current within the coupled inductor. The magnetic saturation is kept at a minimum, which maximizes the efficiency of the power supply.

According to a first implementation form of the first aspect, the compensator is adapted to determine the second pulse width modulation signal in order to compensate for a circulation current within the coupled inductor. An especially high efficiency of the power supply is thereby achieved.

According to a second implementation form of the first aspect, the inverter leg is adapted to generate the first pulse width modulation signal by modulating the input signal with a modulation wave signal m(n), wherein n is a time index. The compensator is adapted to determine the compensation signal dependent upon the modulation wave signal m(n). An especially efficient reduction of circulation current can thereby be achieved.

According to a first implementation form of the second implementation form of the first aspect, the modulation wave signal m(n) is an alternating current (AC) signal. An especially simple modulation can thereby be achieved.

According to a second implementation form of the second implementation form of the first aspect, the compensator is adapted to determine the compensation signal as:

$$Y = 2 \times \Delta m.$$

Y is the compensation signal. $\Delta m$ is determined as $m(n) - m(n-1)$. A very strong reduction in the circulation currents within the coupled inductor is thereby achieved.

According to a first implementation form of the second implementation form of the second implementation form of the first aspect, the compensator is adapted to determine the compensation signal Y limited by a pre-specified maximum value. A continuous operation of the power supply is thereby assured.

According to a third implementation form of the first aspect, the power supply moreover comprises a rectifier, which is adapted to generate a direct current (DC)-bus voltage by rectifying an AC-input voltage. It is thereby possible to very flexibly use the power supply on a mains line.

According to a fourth implementation form of the first aspect, the phase shifter is adapted to generate the provisional second pulse width modulation signal with an identical duty cycle as the first pulse width modulation signal. It is thereby possible to very simply generate the provisional second pulse width modulation signal.

According to a second aspect of the disclosure, a method for generating an output signal is provided. The method comprises generating a first pulse width modulation signal by modulating an input signal, determining a provisional second pulse width modulation signal by phase shifting a signal, the first pulse width modulation signal is derived from, determining a second pulse width modulation signal from the provisional second pulse width modulation signal, by adding a compensation signal, and combining the first pulse width modulation signal and the second pulse width modulation signal through a coupled inductor to form the output signal. Using the compensation signal, it is possible to compensate circulation current within the coupled inductor. The magnetic saturation is kept at a minimum, which maximizes the efficiency of the power supply.

According to a first implementation form of the second aspect, the compensation signal is determined in order to compensate for a circulation current within the coupled inductor. An especially high efficiency of the power supply is thereby achieved.

According to a second implementation form of the second aspect, the first pulse width modulation signal is generated by modulating the input signal with a modulation wave signal m(n), n is a time index. The compensation signal is determined dependent upon the modulation wave signal m(n). An especially efficient reduction of circulation current can thereby be achieved.

According to a first implementation form of the second implementation form of the second aspect, the modulation wave signal is an AC signal. An especially simple modulation can thereby be achieved.

According to a second implementation form of the second implementation form of the second aspect, the compensation signal is determined as $Y = 2 \times \Delta m$. Y is the compensation signal. $\Delta m$ is determined as $m(n) - m(n-1)$. A very strong reduction in the circulation currents within the coupled inductor is thereby achieved.

According to a first implementation form of the second implementation form of the second implementation form of the second aspect, the compensation signal Y is determined limited by a pre-specified maximum value. A continuous operation of the power supply is thereby assured.

According to a third implementation form of the second aspect, the method further comprises generating a DC-bus voltage by rectifying an AC-input voltage. It is thereby possible to very flexibly use the power supply on a mains line.

According to a fourth implementation form of the second aspect, the provisional second pulse width modulation signal is generated with an identical duty cycle as the first pulse width modulation signal. It is thereby possible to very simply generate the provisional second pulse width modulation signal.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity Which performs that specific step or functionality, it should be clear for a skilled person that these methods and functionalities can be implemented in respect of software or hardware elements, or any kind of combination thereof.

BRIEF DESCRIPTION OF THE DRAWINGS

The present disclosure is in the following and explained in detail in relation to embodiments of the disclosure in reference to the enclosed drawings.

DESCRIPTION OF THE EMBODIMENTS

Figure 1:
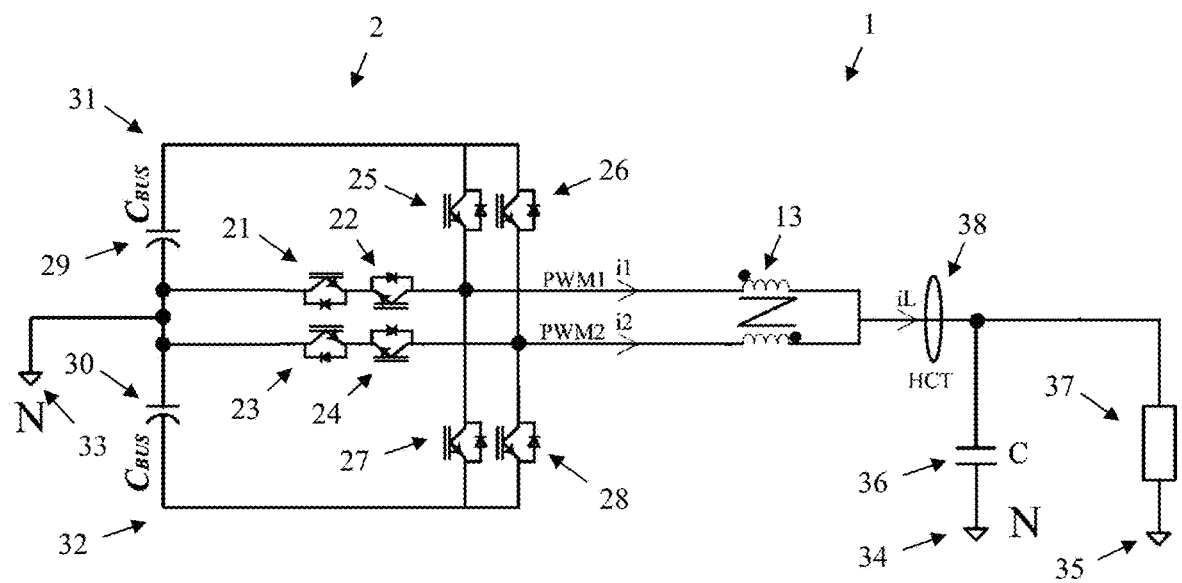
FIG. 1 shows a first exemplary power supply.

First we demonstrate the construction of a switching power supply along FIG. 1. With regard to FIG. 2, the problem of circulation current is further explained. With regard to FIGS. 3-5, the construction and function of different embodiments of the power supply according to the first aspect of the disclosure is described. With regard to FIG. 6 and FIG. 7, achievable results by use of the disclosure are shown. Finally, along FIG. 8, the function of an embodiment of the method according to the second aspect of the disclosure is illustrated. Similar entities and reference numbers in different figures have been partially omitted.

In FIG. 1, an exemplary power supply 1 is shown. The power supply 1 comprises an inverter 2 which has a positive voltage rail 31, a negative voltage rail 32, and a number of switches 21-28. The switches 21-28 are put into practice as a parallel connection of a transistor and a diode, each. Moreover, the positive voltage rail 31 is connected through a capacitance 29 to a ground connection 33. Also the negative voltage rail 32 is connected through a capacitance 30 to the ground connection 33. The inverter 2 is connected to a coupled inductor 13. An output terminal of the coupled inductor 13 is fed through a hall current transducer 38 and connected to a capacitance 36 and a resistance 37. The capacitance 36 is connected to a ground connection 34. The resistance 37 is connected to a ground connection 35.

For operating the power supply 1, a DC-input voltage is supplied between the positive voltage rail 31 and the negative voltage rail 32. The switches 21-28 are switched so that a first pulse width modulation signal PWM1 and a second pulse width modulation signal PWM2 are generated and supplied to two separate inputs of the coupled inductor 13. The coupled inductor 13 combines the two signals forming and output current iL. This current is measured by the hall current transducer 38.

The first pulse width modulation signal PWM1 and the second pulse width modulation signal PWM2 are generated by the switches 21-28 by modulating the input signal with a modulation wave signal. Such a modulation wave signal is for example shown in FIG. 4. The resulting signals are 180° phase shifted. With the set up shown here, it is difficult to ensure a volt-second balance between the coupled legs. This can lead to circulation current within the coupled inductor 13. This circulation current drives the magnetic field within the coupled inductor into saturation leading to a reduced coupling efficiency and thereby to a reduced efficiency of the overall power supply 1.

As explained earlier, this problem can be solved by adding a further hall current transducer for measuring i1 and i2, but this requires great additional effort. Also, this requires a high control frequency of the control loop for reducing the circulation current.

Figure 2:
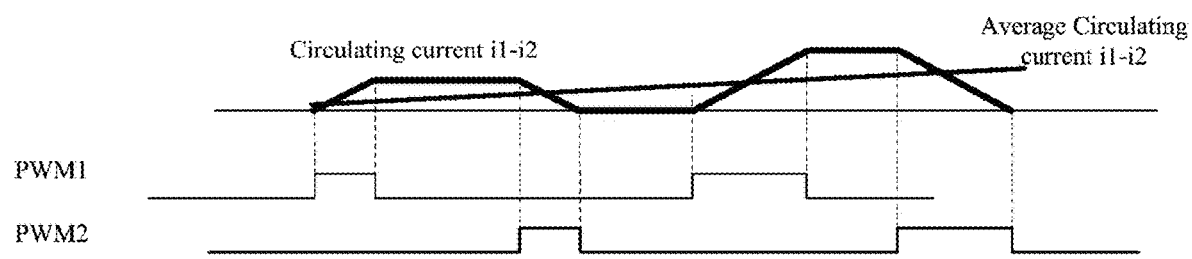
FIG. 2 shows different signals in an exemplary power supply.

In FIG. 2, a first exemplary pulse width modulation signal PWM1 and a second exemplary pulse width modulation signal PWM2 are depicted. Above these signals, the resulting circulation currents are shown. The circulating current is the difference between the current on the first inverter leg and the current on the second inverter leg. As one can easily see, there remains an average circulating current, which drives the magnetic field within the coupled inductor 13 into saturation. Without additional sensors, this cannot be prevented using only the measures shown in FIG. 1. It is not possible to perform a closed loop regulation of the circulating current, since the respective sensors are not present.

Figure 3:
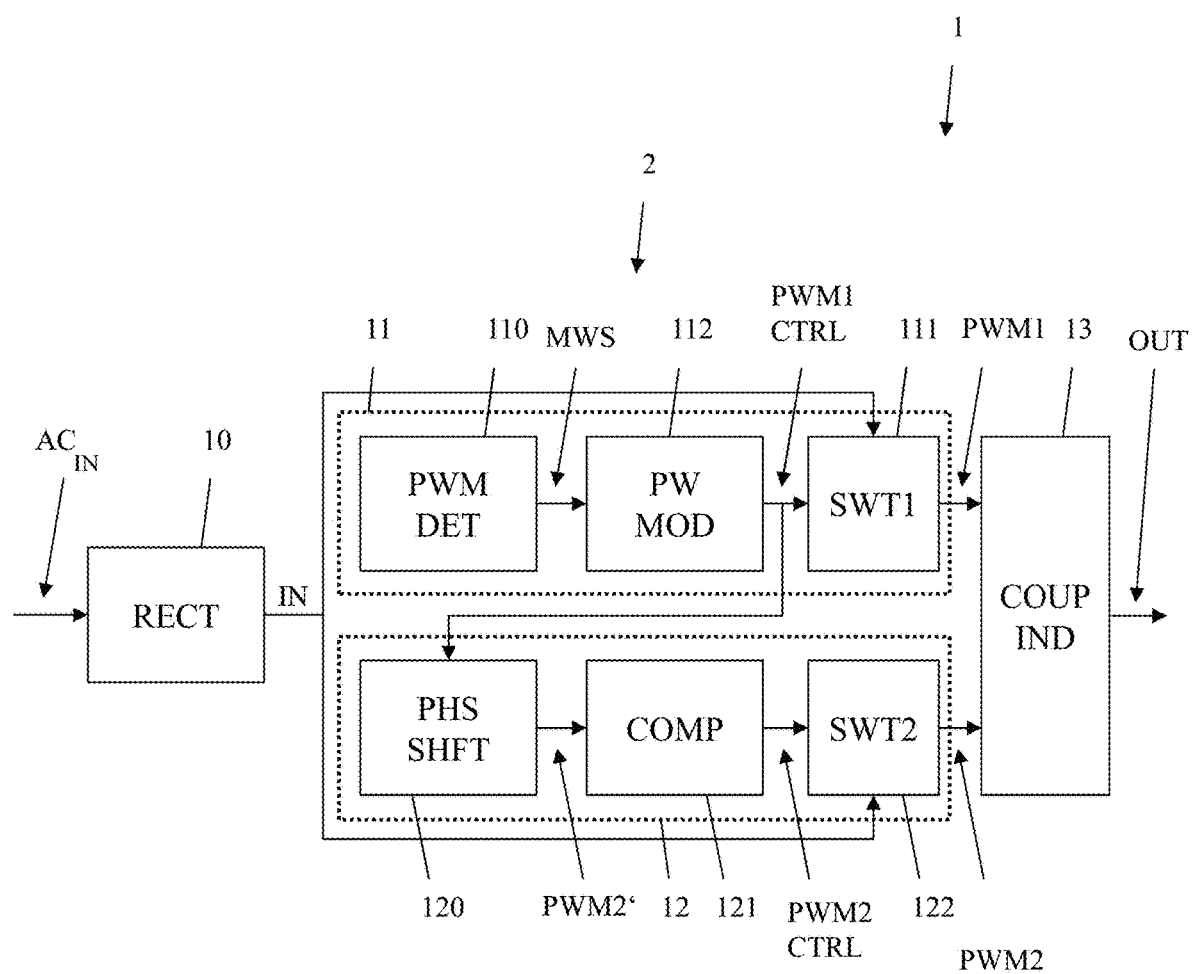
FIG. 3 shows a first embodiment of the power supply according to the first aspect of the disclosure in a block diagram.

The power supply according to FIG. 1 though can be expanded to a power supply according to the first aspect of the present disclosure. Such a power supply 1 is shown in FIG. 3. There, the power supply 1 is shown in a block diagram. A rectifier 10 is connected to an inverter 2, which is moreover connected to a coupled inductor 13. The inverter 2 comprises a first inverter leg 11 and a second inverter leg 12. Only the first inverter leg 11 though operates a conventional pulse width modulator. The first inverter leg 11 comprises a pulse width modulation determining unit 110, which is connected to a pulse width modulator 112, which in turn is connected to a first switch 111.

The second inverter leg 12 on the other hand comprises a phase shifter 120 connected to a compensator 121, which again is connected to a second switch 122. The first inverter leg 11, specifically the first switch 111, is connected to a first leg of the coupled inductor 13. The second inverter leg 12, specifically the second switch 122, is connected to a second leg of the coupled inductor 13. It is important to mention, that the first switch 111 and the second switch 122 can be constructed as a plurality of transistors, as shown in FIG. 1.

When operating the power supply 1, an AC-input signal $AC_{IN}$ is provided to the rectifier 10. The rectifier 10 rectifies the AC-input signal $AC_{IN}$ generating a DC-input signal IN. This input signal IN is provided to the first switch 111 and to the second switch 122.

The pulse width modulation determining unit 110 generates a modulation wave signal MWS and supplies it to the pulse width modulator 112. A carrier signal, preferably a triangle signal is moreover provided to the pulse width modulator. The modulator compares the modulation wave signal MWS to the carrier signal. When the modulation wave signal MWS is larger than the carrier signal, the modulator activates the first switch 111. When the modulation wave signal MWS is smaller than the carrier signal, the modulator deactivates the first switch 111. The resulting signal of the pulse width modulator therefore is a first pulse width modulation control signal PWM2CTRL. This signal activates and deactivates the first switch 111.

The first switch 111 therefore modulates the input signal IN based on the modulation wave signal MWS. A first pulse width modulation signal PWM1 results.

This first pulse width modulation control signal PWM1CTRL is handed to the phase shifter 120, which generates a provisional second pulse width modulation signal PWM2' by phase shifting the first pulse width modulation signal 1 by 180°. The provisional second pulse width modulation signal PWM2' is handed to the compensator 121, which performs a compensation of circulating current within the coupled inductor 13. For this purpose, the compensator 121 adds a compensation signal Y to the provisional second pulse width modulation signal. Especially, this is done by increasing the duty cycle of the provisional second pulse width modulation signal PWM2' by a value Y. This is further shown along FIG. 5. The resulting second pulse width modulation control signal PWM2CTRL is provided to the second switch 122, which modulates the input signal IN using the second pulse width modulation control signal PWM2CTRL. As a result, the second switch 122 generates a second pulse width modulation signal PWM2. The coupled inductor 13 combines the first pulse width modulation signal PWM1 and the second pulse width modulation signal PWM2. This results in the output signal OUT.

Although there is no closed loop control regarding the circulating current within the coupled inductor 13, the above-shown measure still significantly reduces the circulating current, since systematic error within the pulse width modulation signals are corrected.

Figure 4:
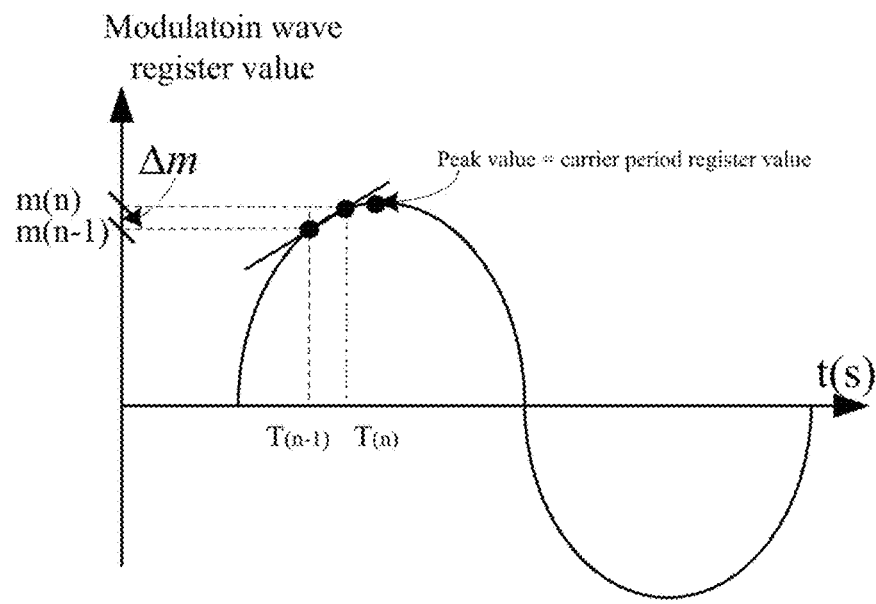
FIG. 4 shows an exemplary modulation wave signal.

In FIG. 4, an exemplary modulation wave signal is shown over time. Here different values of the modulation wave signal at different instances in time are depicted.

Figure 5:
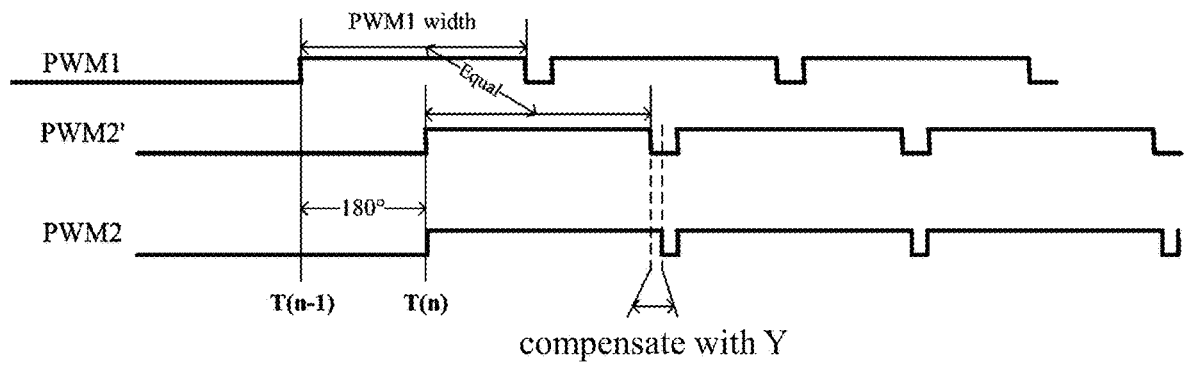
FIG. 5 shows different signals in a second embodiment of the power supply according to the first aspect of the disclosure.

In FIG. 5, the different signals within the power supply 1 of FIG. 3 are shown. The first pulse width modulation signal PWM1 has a certain pulse width. The provisional second pulse width modulation signal PWM2' has the identical pulse width and therefore the identical duty cycle as the first pulse width modulation signal PWM1, but it is phase shifted by 180°. The second pulse width modulation signal PWM2 is still phase shifted by 180° with regard to the first pulse width modulation signal PWM1, but the duty cycle is amended by adding the value Y. This is shown in FIG. 5. The value Y is determined as:

$$Y = 2 \times \Delta m.$$

$\Delta m$ is the difference between two adjacent values of the modulation wave signal. Therefore, m is $m(n)-m(n-1)$. $m(n)$ is the value of the modulation wave signal at the time $T(n)$. $m(n-1)$ is the value of the modulation wave signal at the time $T(n-1)$.

This calculation is based upon a linear approximation. Alternatively, also a more accurate approximation can be used.

Figure 6:
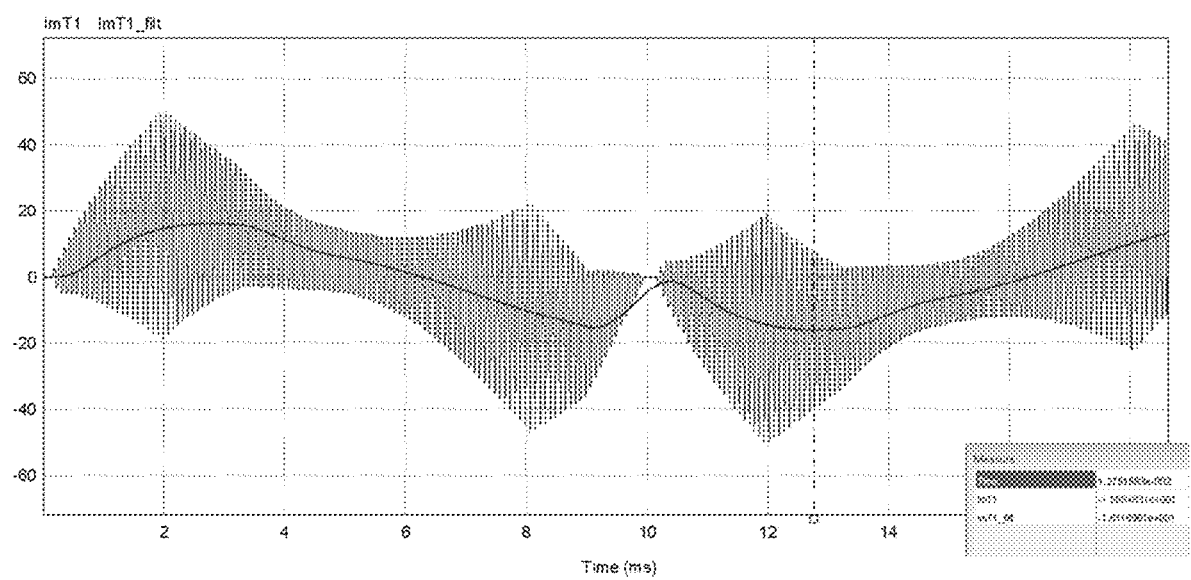
FIG. 6 shows resulting signals.

In FIG. 6, the circulating current I and an average of the circulating current I is depicted over time for a regular power supply, as shown in FIG. 1. It can clearly be seen that the average circulating current has values up to 16 A.

Figure 7:
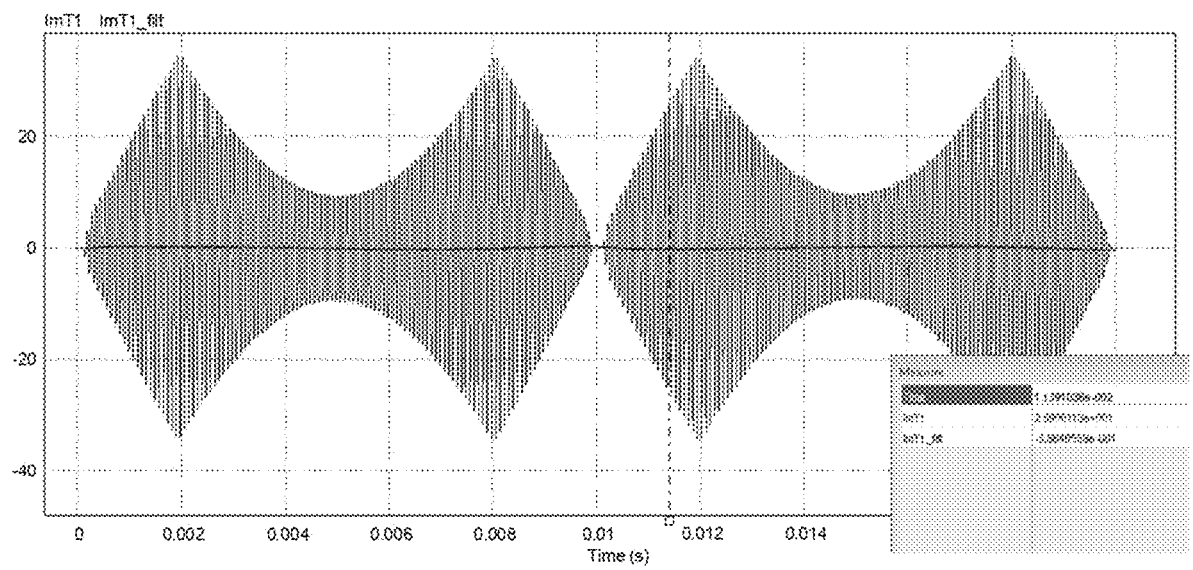
FIG. 7 shows exemplary output signals of a third embodiment of the power supply according to the first aspect of the disclosure.

In FIG. 7, the circulating current and the average circulating current of a power supply according to the first aspect of the disclosure, as shown in FIG. 3 is depicted. Here it can clearly be seen that the average circulating current has a maximum value of lower than 0.5 A. This constitutes a significant reduction in circulating current and therefore in a significant increase in the efficiency of the coupling by the coupling inductor 13.

Figure 8:
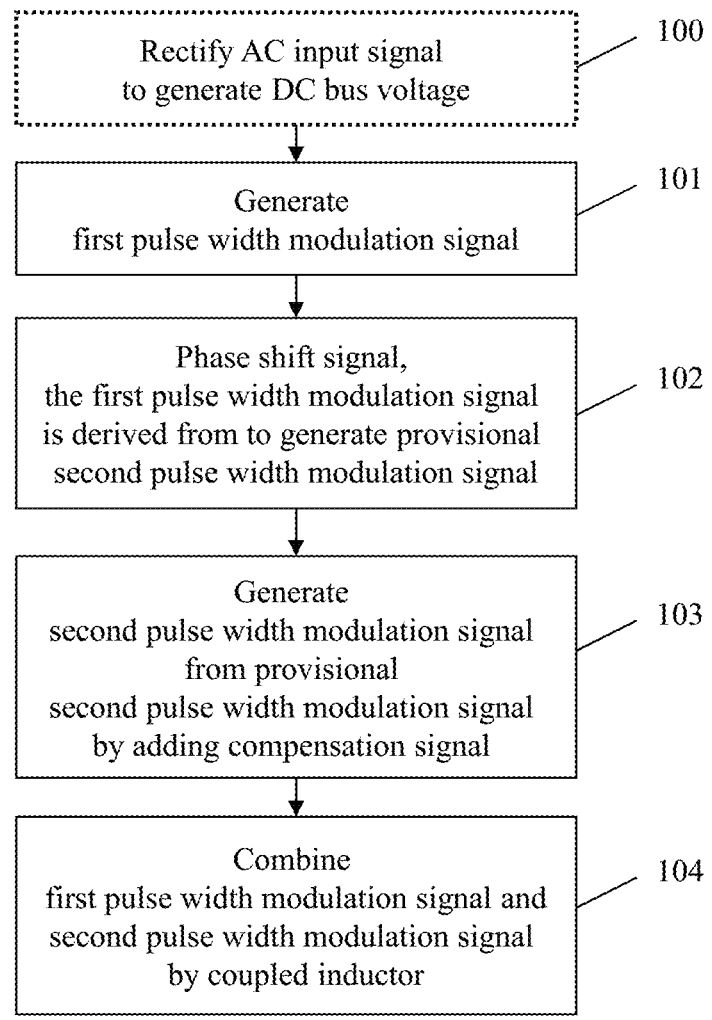
FIG. 8 shows an embodiment of the method according to the second aspect of the disclosure as a flow diagram.

Finally, in FIG. 8, an embodiment of the method according to the second aspect of the disclosure is shown. In an optional first step 100, an AC-input signal is rectified in order to generate a DC-bus voltage. In a second step 101, a first pulse width modulation signal is generated. In a third step 102, a phase shift by 180° of a signal, the first pulse width modulation signal is derived from, is performed. This signal is the first pulse width modulation control signal PWM1CTRL from FIG. 3. This results in a provisional second pulse width modulation signal. In a fourth step 103, a second pulse width modulation signal is generated from the provisional second pulse width modulation signal. This is done by increasing the duty cycle of the provisional second pulse width modulation signal as explained earlier. The compensation signal Y is added to the duty cycle of the provisional second pulse width modulation signal. In a final fifth step 104 the first pulse width modulation signal and the second pulse width modulation signal are combined in a coupled inductor, resulting in an output signal.

The disclosure is not limited to the examples and especially not to the displayed type of inverter. Also the disclosure can be applied to power supplies having more than two converter legs. The characteristics of the exemplary embodiments can be used in any advantageous combination.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

The invention claimed is:

1. A power supply for generating an output signal, comprising:
    an inverter leg configured to generate a first pulse width modulation signal by modulating an input signal with a modulation wave signal m(n), wherein n is a time index;
    a phase shifter configured to generate a provisional second pulse width modulation signal by phase shifting the first pulse width modulation signal;
    a compensator configured to determine a second pulse width modulation signal from the provisional second pulse width modulation signal by adding a compensation signal, wherein the compensation signal is based on the modulation wave signal m(n); and
    a coupled inductor configured to combine the first pulse width modulation signal and the second pulse width modulation signal to form the output signal.

2. The power supply of claim 1, wherein the second pulse width modulation signal compensates for a circulation current within the coupled inductor.

3. The power supply of claim 1, wherein the modulation wave signal m(n) is an alternating current (AC) signal.

4. The power supply of claim 1, wherein the compensation signal is based on the following equation:

$$Y = 2 \times \Delta m,$$

wherein Y is the compensation signal, and wherein $\Delta m$ is determined as $m(n)-m(n-1)$.

5. The power supply of claim 4, wherein the compensation signal is limited by a pre-specified maximum value.

6. The power supply of claim 1, further comprising a rectifier configured to generate a direct current (DC) bus voltage by rectifying an alternating current (AC) input voltage.

7. The power supply of claim 1, wherein the provisional second pulse width modulation signal has an identical duty cycle as the first pulse width modulation signal.

8. The power supply of claim 1, further comprising a first switch, wherein the modulation wave signal m(n) is used to activate and deactivate the first switch.

9. The power supply of claim 1, further comprising a second inverter leg separate from the inverter leg, wherein the second inverter leg comprises the phase shifter and the compensator.

10. The power supply of claim 9, wherein the inverter leg comprises a pulse width modulator configured to generate the first pulse width modulation signal.

11. A method for generating an output signal, comprising:
    generating a first pulse width modulation signal by modulating an input signal with a modulation wave signal m(n), wherein n is a time index;
    determining a provisional second pulse width modulation signal by phase shifting the first pulse width modulation signal;
    determining a second pulse width modulation signal from the provisional second pulse width modulation signal by adding a compensation signal, wherein the compensation signal is based on the modulation wave signal m(n); and
    combining the first pulse width modulation signal and the second pulse width modulation signal to form the output signal.

12. The method of claim 11, wherein the compensation signal compensates for a circulation current.

13. The method of claim 11, wherein the modulation wave signal m(n) is an alternating current (AC) signal.

14. The method of claim 11, wherein the compensation signal is determined using the equation:

$$Y = 2 \times \Delta m,$$

wherein Y is the compensation signal, and wherein $\Delta m$ is determined as $m(n)-m(n-1)$.

15. The method of claim 14, wherein the compensation signal is limited by a pre-specified maximum value.

16. The method of claim 11, further comprising generating a direct current (DC) bus voltage by rectifying an alternating current (AC) input voltage.

17. The method of claim 11, wherein the provisional second pulse width modulation signal has an identical duty cycle as the first pulse width modulation signal.

18. The method of claim 11, wherein the provisional second pulse width modulation signal is determined by phase shifting the first pulse width modulation signal by 180 degrees.

19. The method of claim 11, wherein adding the compensation signal comprises increasing a duty cycle of the provisional second pulse width modulation signal by the compensation signal.

20. The method of claim 11, further comprising determining the second pulse width modulation signal by modulating the input signal with a second pulse width modulation control signal.

* * * * *